UNITED STATES PATENT OFFICE.

ARTHUR PERCY STROHMENGER, OF WESTMINSTER, LONDON, ENGLAND, ASSIGNOR TO SLAUGHTER & COMPANY, LIMITED, OF LONDON, ENGLAND, A CORPORATION OF GREAT BRITAIN AND IRELAND.

ELECTRIC WELDING AND FUSION DEPOSITION OF METALS.

1,144,390.   Specification of Letters Patent.   Patented June 29, 1915.

No Drawing.   Application filed December 23, 1914. Serial No. 878,806.

*To all whom it may concern:*

Be it known that I, ARTHUR PERCY STROHMENGER, a subject of the King of Great Britain, and residing at Caxton House, Westminster, London, S. W., England, have invented certain new and useful Improvements in Electric Welding and Fusion Deposition of Metals, of which the following is a specification.

In the process of welding metals or depositing metals by fusion, wherein an electrode is connected to one pole of a source of current, and the work to the other pole, it is sometimes found that the weld or deposit is not as satisfactory as it should be, and this may be due to a variety of causes. In the case particularly of hard steels the surface may be deteriorated by pitting or otherwise. The slag also sometimes tends to adhere to the surface and is difficult to get away in the welding or deposition of carbon steels. Now I have found that if I use in conjunction with the electrode, a relatively small quantity of a different metal capable of exerting a strong reducing action, that is to say a metal having a strong affinity for oxygen at the temperature at which the welding or deposition takes place, I can obtain better and more uniform results, while the welding or deposition is more easily effected.

Aluminium fulfils the purpose admirably as it can be used in the form of a fine wire which may be laid alongside the electrode and bound therewith in the covering of insulating material such as blue asbestos which ultimately forms the slag during the welding or depositing operation. It is found that the aluminium oxidizes and so prevents to a considerable extent the oxidation of the deposited metal, which oxidation always takes place to a certain extent in spite of the protective slag layer. Such oxidation has been a cause of difficulty hitherto in the welding or deposition of alloys such as chrome-nickel, the components of which readily oxidize at the high fusion temperature. The use of the additional wire of aluminium largely obviates this difficulty. The alumina formed passes away with the slag and does not interfere at all with the homogeneity of the weld or deposit.

The use of aluminium in conjunction with the electrode is also of advantage in reducing the percentage of carbon necessary in the metal of the electrode when a weld or deposit of a carbon steel is required. Owing to its reducing action the aluminium shields to some extent the carbon of the steel from the oxidation to which it is liable in the fusion. It is still necessary to use an electrode having a somewhat higher carbon content than that required in the weld or deposit, but it is a desideratum to avoid the necessity for using such high carbon steels as are now needed in electrodes for certain purposes, and the use of this invention enables an appreciable reduction to be made. For instance, where a steel containing 0.9% of carbon was formerly required as electrode, a percentage of 0.8 or 0.7 may suffice when the electrode is used with an aluminium wire beside the same.

The aluminium employed is very small in amount as compared with the electrode metal; for example, an iron electrode of gage 10 requires only an aluminium wire of gage 34 placed alongside it and inclosed with it in the insulating coating, in order to attain the advantages of this invention. In this case the amount of aluminium used in relation to the iron is about 0.2%.

Having thus described my invention, what I claim as new and desire to secure by Letters Patent is:—

1. An electrode for use in a process of electric welding or fusion-deposition of metals, comprising a metallic core and another metal adjacent said core, the other metal being capable of exerting a strong reducing action at the fusion temperature, and an insulating layer upon said core.

2. An electrode for use in a process of electric welding or fusion-deposition of metals, comprising a metallic core, a wire of another metal having a greater affinity for oxygen than the core metal, and laid alongside the metal core, and an insulating coating around the core and wire.

3. An electrode for use in a process of electric welding or fusion-deposition of metals, comprising a metallic core of a composition selected according to the nature of the metal to be treated, a wire of aluminium of relatively small gage laid beside the core, and an insulating coating.

4. As a new article of manufacture an electrode comprising a metallic core, a relatively thin wire of aluminium laid alongside said core and a cover of insulating material capable of forming a slag at the fusion temperature of the core.

5. As a new article of manufacture, an electrode for use in electric welding and fusion-deposition of metals, comprising a metallic core of a composition selected according to the nature of the metal to be deposited, a relatively fine wire of aluminium disposed adjacent to said core along the same, and a binding of a material of a refractory fibrous nature such that it will melt and form a slag at the fusion temperature of the core.

In witness whereof I have hereunto signed my name this 8th day of December, 1914, in the presence of two subscribing witnesses.

ARTHUR PERCY STROHMENGER.

Witnesses:
  H. W. BLAKE,
  H. D. JAMESON.